Patented Nov. 17, 1942

2,302,362

UNITED STATES PATENT OFFICE 2,302,362

STABILIZATION OF HALOGEN CONTAINING ORGANIC MATERIALS

Johannes Nelles, Leverkusen-Schlebusch, and Otto Bayer, Leverkusen-I. G. Werk, Germany; vested in the Alien Property Custodian No Drawing. Application September 27, 1939, Serial No. 296,808. In Germany February 1, 1938

10 Claims. (Cl. 260—735)

The present invention relates to a new composition of matter comprising chlorine containing substances.

It is known that many organic halogen containing substances show a tendency of splitting off part of the halogen in the form of hydrogen halide, if exposed to an elevated temperature. In many cases such tendency is to be observed even at normal temperature. This is true, for instance, in case of chlorinated or brominated low and high molecular aliphatic compounds, such as, for instance, chlorinated paraffinic hydrocarbons, chlorinated rubber, chlorobutadiene polymerisates, polyvinylchloride, polymeric vinyl chloroacetate and mixed polymerisates containing such ingredients. Finally, there may be mentioned chlorinated acids and esters, as for instance, chlorinated fats, oils and train oils.

As a matter of fact, the practical use of such halogen containing compounds can be considerably handicapped or even completely destroyed by such undesirable properties. It is the object of this invention to do away with these disadvantages and to develop a new type of stabilizers for such compounds which combine with the hydrogen halide, which might be split off, at the very moment of its formation and convert the same into a harmless substance, so that free hydrogen halide cannot be found within or in the presence of such compounds.

We have found that the tendency of splitting off hydrogen halide of such compounds can be avoided by incorporating therewith certain stabilizing agents which may be defined as N-acyl ethylene-imines or the corresponding propyleneimines. Our new stabilizers correspond to the following formulae:

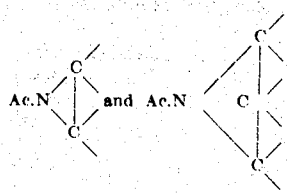

it being understood that the free bonds of the carbon atoms may be bound to hydrogen or various substituents. The N-acyl ethylene-imines can be prepared in various ways, for instance, by causing organic acid chlorides to react upon ethylene-imine or substitution products thereof. The corresponding propylene-imines can be prepared by acylating propylene-imines which are described in "Berichte der Deutschen Chemischen Gesellschaft," vol. 21, page 2677. N-acyl propylene-imines are also known from "Ber. d. Deutsch. Chem. Ges." vol. 31, page 3265 and vol. 32, page 2035. By the addition of such stabilizers the substances having the tendency to split off hydrogen halide are stabilized in such a way that even after a very long heating to an elevated temperature no free hydrogen halide can be found. The new stabilizer shows a neutral reaction, and, therefore, there is no danger involved thereby of any chemical interaction with the substances to be stabilized. In general, the stabilizing effect of such compounds is such that an amount of about 0.5 to about 10 per cent is sufficient for the purpose in question. The stabilizer must be capable of being homogenously incorporated within the compound to be stabilized, at least partly.

The incorporation of our stabilizers within the halogen containing substances to be stabilized may be effected in various ways, for instance, by mixing the substances with or without dissolving or swelling agents, by working the mixture on the roller and so on. It is also possible, to add the stabilizer before or during the preparation of such halogen containing compounds, i. e., during the polymerization of halogen containing substances, such as, chlorobutadiene so that they are in this way incorporated within the final products.

It is to be understood that the term "acyl" comprises carboxylic acid groups as well as sulfonic acid groups and radicals of other organic acids. The nature of the acyl radical is immaterial, provided, however, that the stabilizer is compatible with the compound to be stabilized as is more fully explained above. In case high molecular halogen containing substances are employed, such as chlorinated natural or synthetic rubber or polyvinylchloride, care should be taken, that the stabilizer has a boiling point above about 180° C. in order to prevent the same from evaporating from the said materials. The new compositions may contain various other ingredients such as filling materials, pigments, softeners and the like.

The present invention is illustrated by the following examples:

Example 1

A 30% solution of chlorinated rubber (chlorine content: about 62%) in xylene is mixed with 5% (calculated on the chlorinated rubber) of N-benzenesulfonyl-ethylene-imine (prepared by causing benzenesulfonyl chloride to react with ethylene-imine) and heated to 100° C. After heating for 30 hours at this temperature the solution does not show an acid reaction. The same solution, without the addition of the stabilizer under the same conditions splits off hydrogen chloride even after heating it for 15 minutes.

Instead of N-benzenesulfonyl-ethylene-imine there can be employed N-stearoyl-ethylene-imine (prepared from stearoyl chloride and ethyleneimine) or N-benzoylethylene-imine (Berichte der Deutschen Chemischen Gesellschaft, vol. 28, III, page 2933).

Similar results are obtained by replacing the chlorinated rubber by polyvinylchloride, polymeric 2-chlorobutadiene or 2-bromobutadiene or by chlorinated butadiene-1.3-polymerisates.

Example 2

Chlorinated paraffin (chlorine content: 40.2%) is mixed with 2 per cent by weight of an acylated ethylene-imine which has been prepared in the usual way by causing chlorides of acids obtained by the oxidation of paraffin (mixture of $C_8$ to $C_{10}$) with ethylene-imine. Contrary to the chlorinated paraffin itself, this mixture does not split off any free hydrogen chloride even after heating the same to 100° C. for a long time.

Example 3

Amylchloride is mixed with 2 per cent by weight of N-benzoylethylene-imine and heated to 60° C. After heating the mixture for 10 days a strip of Congo-paper, dipped into the liquid, does not show any acid reaction.

Example 4

After-chlorinated polyvinylchloride is treated with 5% N-benzoylethylene-imine. The mass thus obtained is essentially more stable at 120° C. than it is without the stabilizing addition.

Example 5

A 30% solution of chlorinated rubber in xylene is mixed with 5% (calculated on the chlorinated rubber) of N-benzenesulfonyl-propylene-imine (produced from cyclopropylene-imine and benzenesulfonic chloride) and heated to 100° C. After heating the solution for 50 hours, it does not show an acid reaction. The same solution without addition of the stabilizer; however, under the same conditions splits off hydrogen chloride even after being heated for 15 minutes. In the same way other chlorinated or brominated materials, such as, for instance, fats, oils, train oil, ethylenetetrachloride and the like may be stabilized.

We claim:

1. The composition of matter as claimed in claim 5 wherein the N-benzenesulfonyl-ethylene-imine is present in an amount between about 0.5 and 10% of the amount of the halogen containing substance.

2. The composition of matter as claimed in claim 6 wherein the N-benzoylethylene-imine is present in an amount between about 0.5 and 10% of the amount of the halogen containing substance.

3. The composition of matter comprising a member of the group consisting of N-acyl ethylene-imines and N-acyl propylene-imines and an organic substance containing organically bound halogen and showing the tendency of splitting off halogen in form of hydrogen halide the N-acyl-imine being present in an amount sufficient to neutralize any halogenhalide split off from the halogen containing substance.

4. The composition of matter comprising a member of the group consisting of N-acyl ethylene-imines and N-acyl-propylene imines and an organic substance containing organically bound halogen and showing the tendency of splitting off halogen in form of hydrogen halide, the former being present therein in an amount between about 0.5 and 10% of the amount of the halogen containing substance.

5. The composition of matter comprising N-benzenesulfonyl-ethylene-imine and an organic substance containing organically bound halogen and showing the tendency of splitting off halogen in form of hydrogen halide the former being present in an amount sufficient to neutralize any halogenhalide split off from the halogen containing substance.

6. The composition of matter comprising N-benzoylethylene-imine and an organic substance containing organically bound halogen and showing the tendency of splitting off halogen in form of hydrogen halide the former being present in an amount sufficient to neutralize any halogen halide split off from the halogen containing substance.

7. The composition of matter comprising chlorinated rubber and a member of the group consisting of N-acyl ethylene-imines and N-acyl propylene-imines the latter being present in an amount sufficient to neutralize any hydrogen chloride split off from the chlorinated rubber.

8. The composition of matter comprising chlorinated rubber and a member of the group consisting of N-acyl-ethylene-imines and N-acyl-propylene-imines, the latter being present therein in an amount between about 0.5 and 10% of the amount of the chlorinated rubber.

9. The composition of matter comprising chlorinated rubber and N-benzoyl ethylene-imine the latter being present in an amount sufficient to neutralize any hydrogen chloride split off from the chlorinated rubber.

10. The composition of matter comprising chlorinated rubber and between about 0.5 and about 10% thereof of N-benzoyl ethylene-imine.

JOHANNES NELLES.
OTTO BAYER.